(12) United States Patent
Kasperkiewicz et al.

(10) Patent No.: US 7,783,641 B2
(45) Date of Patent: Aug. 24, 2010

(54) TAXONOMETRIC PERSONAL DIGITAL MEDIA ORGANIZATION

(75) Inventors: Tomasz S. M. Kasperkiewicz, Redmond, WA (US); Benjamin R. Peart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 11/588,898

(22) Filed: Oct. 26, 2006

(65) Prior Publication Data
US 2008/0104114 A1 May 1, 2008

(51) Int. Cl.
G06F 7/00 (2006.01)
G06F 17/30 (2006.01)
(52) U.S. Cl. ..................................... 707/738
(58) Field of Classification Search ............... 707/104.1, 707/738
See application file for complete search history.

(56) References Cited

U.S. PATENT DOCUMENTS

| | | |
|---|---|---|
| 5,721,911 A | 2/1998 | Ha et al. |
| 6,282,548 B1 | 8/2001 | Burner et al. |
| 6,292,792 B1 | 9/2001 | Baffes et al. |
| 6,311,194 B1 | 10/2001 | Sheth et al. |
| 6,442,545 B1 | 8/2002 | Feldman et al. |
| 6,446,061 B1 | 9/2002 | Doerre et al. |
| 6,760,721 B1 | 7/2004 | Chasen et al. |
| 6,947,947 B2 | 9/2005 | Block et al. |
| 7,296,032 B1 * | 11/2007 | Beddow ............... 707/103 R |
| 2004/0122740 A1 | 6/2004 | McCarrick et al. |
| 2005/0080781 A1 | 4/2005 | Ryan et al. |
| 2005/0193015 A1 * | 9/2005 | Logston et al. .......... 707/104.1 |
| 2005/0203971 A1 | 9/2005 | Koskimies et al. |
| 2006/0026496 A1 | 2/2006 | Joshi et al. |
| 2007/0125325 A1 * | 6/2007 | Uenoyama et al. ....... 123/73 PP |
| 2007/0198418 A1 * | 8/2007 | Macdonald et al. ........... 705/52 |

OTHER PUBLICATIONS

Perez, "Del.icio.us: Social bookmarking phenomenon," (http://www.pcworld.idg.com.au/article/144349/del_icio_us_social_bookmarking_phenomenon?fp=2&fpid=1) Nov. 17, 2005, 1-4.*
Herry, et al., "A Metadata Registry for the Semantic Web", Date: May 2002, vol. 8, No. 5, D-Lib Magazine, http://dlib.org/dlib/may02/wagner/05wagner.html.

* cited by examiner

Primary Examiner—John E Breene
Assistant Examiner—Aleksandr Kerzhner
(74) Attorney, Agent, or Firm—Mayer & Williams PC

(57) ABSTRACT

Network-based and client-based operating environments implement computerized systems and techniques for organizing and discovering digital media objects originating from personal digital media sources. The association between a user-selected computer-usable descriptor and a particular digital media object serves as a semantic medium for exchange of information about the digital media object via a network, independent of whether the digital media object is registered with an established digital content sharing service. A user-selected computer-usable descriptor is part of one or more collections of such descriptors that are organized into published data structures having data elements corresponding to particular real-world meanings. Leveraging the consistent associations of computer-usable descriptors with the subject matter of personal digital media content within digital media objects enables the widespread and efficient computerized discovery of relevant digital media objects.

10 Claims, 4 Drawing Sheets

TAXONOMETRIC PERSONAL DIGITAL MEDIA ORGANIZATION

BACKGROUND

The "Semantic Web" and "Web 3.0" are terms coined to describe efforts to provide and use tools, techniques, and technologies that allow computer-processable descriptive information to supplement or replace the content of documents in the global information space known as the World Wide Web (the "Web"). Web documents are often written in Hyper Text Markup Language ("HTML"), which permits items in a Web document to be classified in terms of document organization or visual layout, but does not generally allow for classification of a particular item based on a semantic description of the content of the item. Examples of tools, techniques, and technologies useful in conjunction with the Semantic Web/Web 3.0 include Resource Description Framework ("RDF") and RDF schemas, Extensible Markup Language ("XML") and XML schemas, and Web Ontology Language ("OWL").

In addition to Web documents, there are many other types of resources on the Web. Digital media objects such as video files, audio files, image files, graphics files, multimedia files and playlist files are examples of resources that are not part of Web documents. Efforts associated with the Semantic Web/Web 3.0 do not always address organization and accessibility of non-Web document resources.

Online digital media sharing services, which are hosted by network-side Web sites that encourage users to upload digital media objects to the Web, have enjoyed tremendous growth in recent years partly because of the ever-increasing amount of personal digital media content created by people using a wide variety of personal digital media sources. Examples of personal digital media sources are personal media rendering devices, personal computers, phones, digital cameras, and personal digital assistants. In seeking to exchange digital media objects with others, people desire both to share their own digital media objects and to discover the digital media objects of others that may be of interest to them.

Because each resource on the Web can be referenced—and often accessed or linked to via the Internet—using a Uniform Resource Identifier ("URI") address, theoretically each individual digital media object on the Web is locatable via its unique URI. As a practical matter, however, personal digital media objects are serendipitously named by their creators, making the discovery of a particular digital media object having digital content related to a particular subject matter difficult without either knowledge obtained from the creator or registration with an established digital media sharing service that provides some organizational framework for uploaded digital content.

SUMMARY

Aspects of establishing and using taxonomies to facilitate computerized cataloging and searching for digital media objects that include personal digital media content (such as video samples, audio samples, graphics, images, multimedia content, and playlists) relating to certain identifiable subject matter are discussed herein. A particular digital media object is associated (for example, tagged) with a user-selected computer-usable descriptor having a real-world meaning corresponding to the subject matter of the personal digital media content of the particular digital media object. The association serves as a semantic medium for exchange of information about the digital media object, independent of whether the digital media object is registered with an established digital media content sharing service.

The computer-usable descriptor is part of one or more collections of computer-usable descriptors that are organized into hierarchical data structures having data elements corresponding to particular real-world meanings and accessed by user agents at one or more processing locations of a network. Systems and services related to the publication, discovery, updating, and user selection of computer-usable descriptors, as well as the use of such computer-usable descriptors to locate and exchange information about digital media objects originating from personal digital media sources around the world, are implemented in both network-based and client-based operating environments.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Network-based and client-based operating environments implement computerized systems and techniques for organizing and discovering digital media objects originating from personal digital media sources. The association between a user-selected computer-usable descriptor and a particular digital media object serves as a semantic medium for exchange of information about the digital media object via a network, independent of whether the digital media object is registered with an established digital content sharing service. Leveraging the consistent associations of computer-usable descriptors with the subject matter of personal digital media content within digital media objects enables the widespread and efficient computerized discovery of relevant digital media objects.

A user-selected computer-usable descriptor is part of one or more collections of such descriptors that are organized into published data structures having data elements corresponding to particular real-world meanings. The collections of computer-usable descriptors are accessible and optionally updatable by users, and may be used to search for and exchange information about digital media objects via networks.

Figure 1:
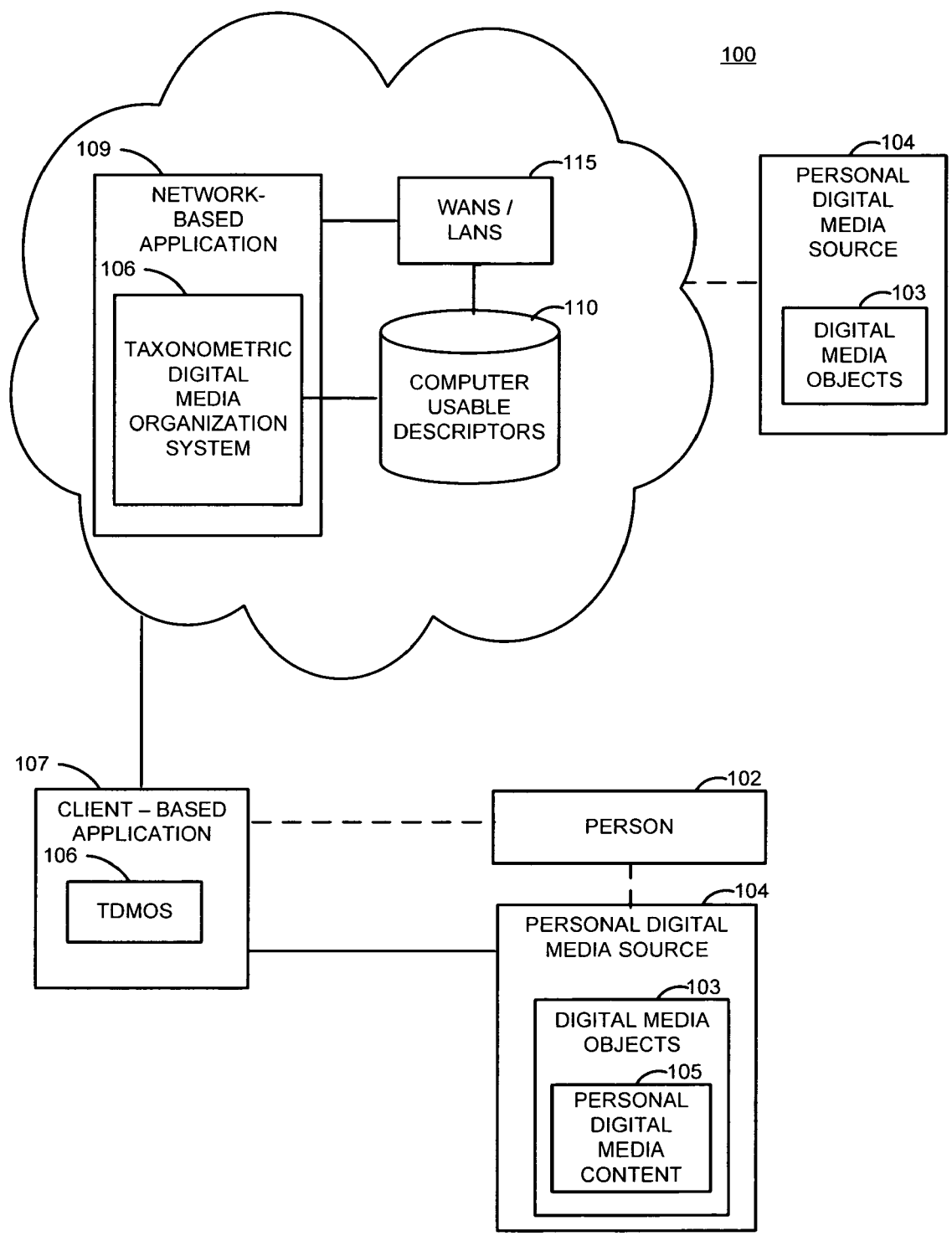
FIG. 1 is a simplified functional block diagram of an architecture via which digital media objects are organized or discovered using aspects of a taxonometric digital media organization system implemented by a user agent and/or a network-based service.

Turning to the drawings, where like numerals designate like components, FIG. 1 is a simplified functional block diagram of an architecture 100 via which digital media objects 103 are organized and discovered through associations with computer-usable descriptors 110. Digital media objects 103 represent any item stored in a digital format. Examples of digital media objects 103 are computer-readable files, such as video files, audio files, image files, graphics files, text files, multimedia files, data files, and playlists. Digital media objects are composed of personal digital media content 105 such as video samples, audio samples, images, graphics, text, multimedia samples, data, and playlist information. Digital media objects 103 are generally stored on network-accessible computer-readable media 404 (computer-readable media are discussed in connection with FIG. 4), and may exist in any available formats or protocols or combinations thereof, such as portable network graphics ("PNG"), joint photographic experts group ("JPEG"), moving picture experts group ("MPEG"), multiple-image network graphics ("MNG"), hypertext markup language ("HTML"), Adobe Acrobat ("PDF"), extensible HTML ("XHTML"), MP3, WAV, or Microsoft® Windows Media® player formats such as WMA, WMV, or ASF.

Digital media objects 103 originate from a personal digital media source 104 (two personal digital media sources 104 are shown in FIG. 1). A personal digital media source is any wireless or wired electronic device or any physical or logical element of such an electronic device, either standing alone or included in other devices, the operation of which is directed by a person 102. Examples of personal digital media sources are personal media rendering devices, personal computers, phones, digital cameras, digital video recorders, and personal digital assistants.

Computer-usable descriptors 110 are items of metadata, in any form or format, which have agreed-upon real-world meanings. Individual computer-usable descriptors are organized, along with other computer-usable descriptors, into schemes for organizing related pieces of information. In one implementation, computer-usable descriptors correspond to data elements of hierarchically organized data structures such as trees, lists, arrays, or tables. In an exemplary scenario where a collection of computer-usable descriptors is organized into a tree structure, a root computer-usable descriptor is located at the top of the tree, and other computer-usable descriptors are attached (for example, hyperlinked) to one or more computer-usable descriptors, or nodes, directly beneath them in the tree. In another implementation, computer-user descriptors correspond to data elements of relationally organized data structures. It will be understood that organizational schemes for computer-usable descriptors may be entirely hierarchical (or relational), or that hybrid types of organizational schemes may be used.

Figure 4:
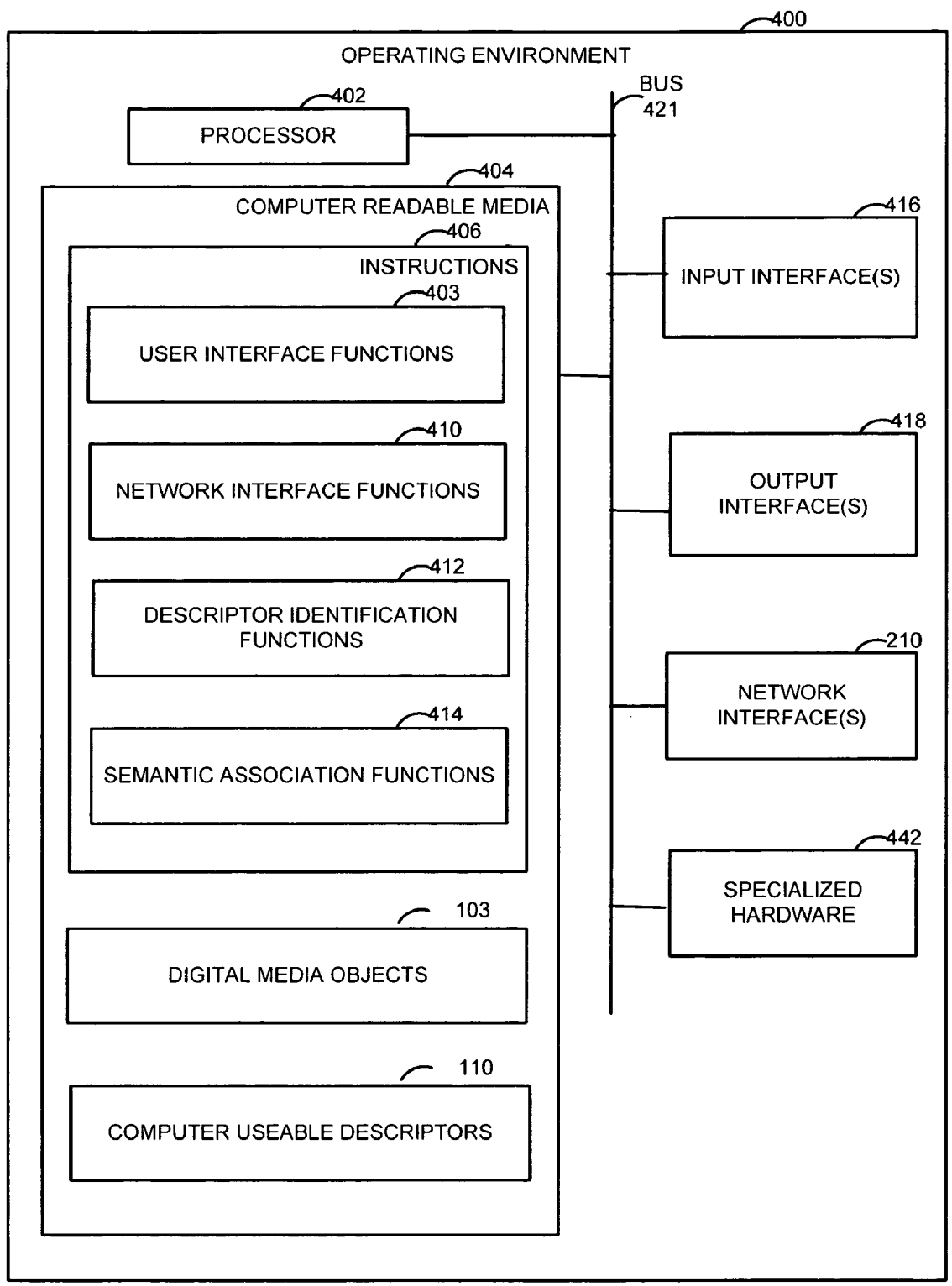
FIG. 4 is a simplified functional block diagram of an exemplary configuration of an operating environment in which the system shown in FIG. 2 may be implemented or used.

Collections of computer-usable descriptors 110 form one or more taxonomies relating to particular bodies of knowledge or topics, which are stored in one or more network-accessible computer-readable media (computer-readable media are discussed in connection with FIG. 4). Generally, collections of computer-usable descriptors 110 are published at processing locations associated with one or more networks 115.

A processing location is a fixed or mobile network node that has a unique address or identifier. Generally, networks 115 include wide area networks ("WANs") or local area networks ("LANs"). WANs are wireless or wired dispersed networks covering one or more geographic regions of more than a few hundred meters. WANs may be packet-switched networks or a circuit-switched networks or combinations thereof. The Internet is one example of a WAN. LANs are wireless or wired networks that facilitate the transmission or receipt of information within relatively small physical areas surrounding a device or an entity (generally, up to a few hundred meters).

A taxonometric digital media organization system ("TDMOS") 106 (discussed in detail in connection with FIG. 2) arranges for the creation and/or leveraging of associations between digital media objects 103/personal digital media content 105 and computer-usable descriptors 110. Aspects of TDMOS 106 may be implemented by a client-based application 107 or a network-based application 109. Client-based application 107 may have few or many locally installed resources. Examples of client-based applications include but are not limited to Web browsers and rich clients. Network-based application 109 may be a Web service hosted by various entities within wide-area or local-area networks 115.

Figure 2:
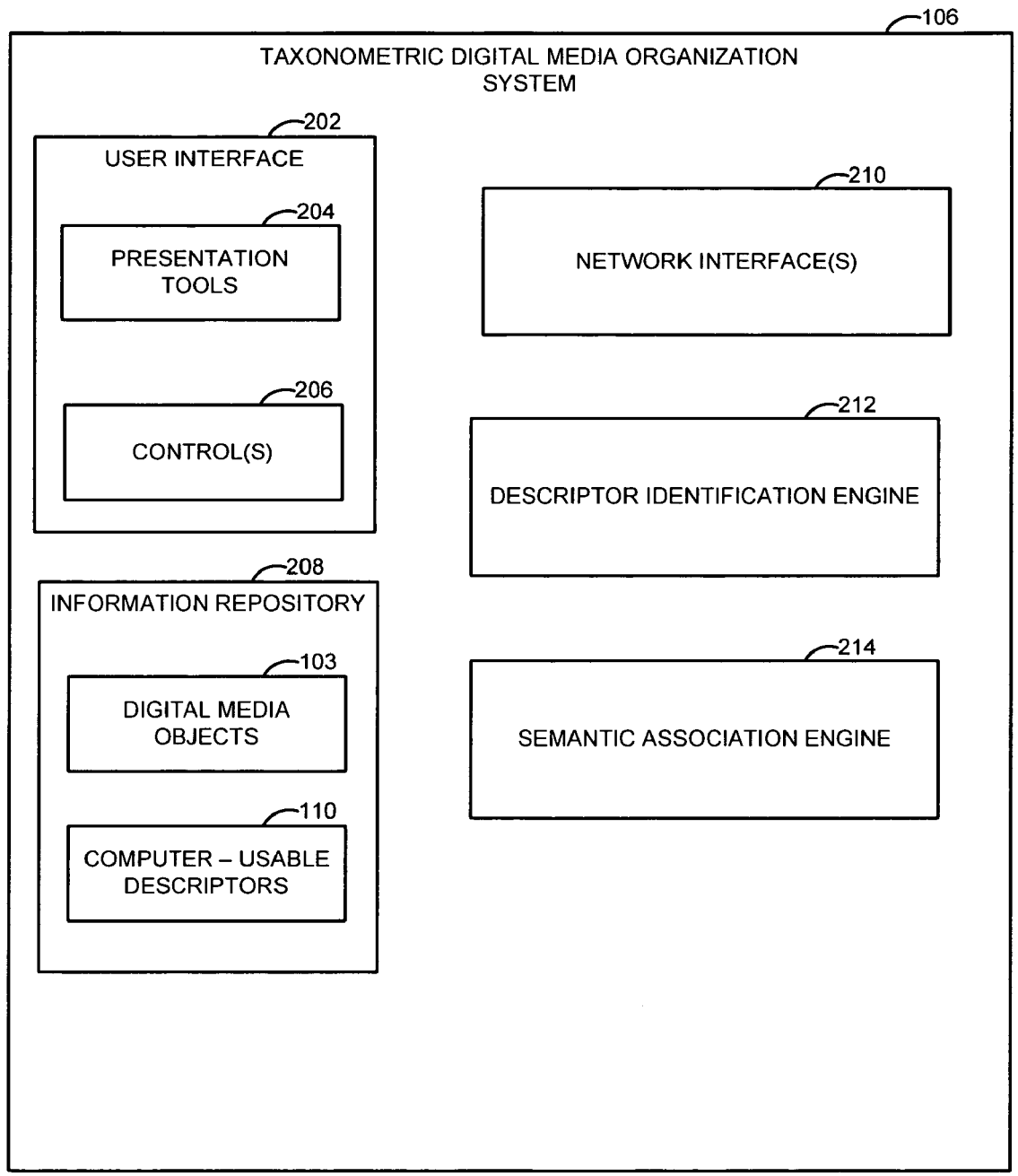
FIG. 2 is a simplified functional block diagram of the taxonometric digital media organization system shown in FIG. 1.

With continuing reference to FIG. 1, FIG. 2 a simplified functional block diagram of TDMOS 106, which is generally responsible for arranging for user selection of one or more computer-usable descriptors 110 and associating (for example, tagging or searching for) digital media object 103 with selected computer-usable descriptors 110. It will be appreciated that a wide variety of features, functions, and user experiences may be created using aspects of the systems and techniques described herein.

TDMOS 106 includes a user interface 202, which further includes presentation tool(s) 204 and control(s) 206; an information repository 208, which stores, among other things, digital media objects 103 or references thereto and associated computer-usable descriptors 110 or references thereto; network interface(s) 210; descriptor identification engine 212; and semantic association engine 214. In general, design choices dictate how specific functions of TDMOS 106 are implemented. Such functions may be implemented using hardware, software, firmware, or combinations thereof.

User interface 202 represents the combination of presentation tools 204 and controls 206 that define the way a user interacts with a particular application or device, such as client-based application 107 or network-based application 109. Presentation tools 204 are used to receive input from, or provide output to, a user. An example of a physical presentation tool is a display such as a monitor device. An example of a logical presentation tool is a data organization technique (for example, a window, a menu, or a layout thereof). Controls 206 facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Information repository 208 represents data storage or organization capability for information relating to association of digital media objects 103 with computer-usable descriptors 110. Information repository may be implemented using various types and arrangements of computer-readable media 404 (discussed in connection with FIG. 4).

Network interface(s) 210 represent one or more physical or logical elements, such as connectivity devices or computer-executable instructions that enable communication between client-based application 107 and network-based application 109 or other network-side entities or services, via one or more protocols or techniques. Such communication may be, but is not necessarily, client-server type communication. Information received at a given network interface may traverse one or more of the several vertical layers of the OSI Internetworking Model: layer 1, the physical layer; layer 2, the data link layer; layer 3, the network layer; layer 4, the transport layer; layer 5, the session layer; layer 6, the presentation layer; and layer 7, the application layer.

Descriptor identification engine 212 is configured to implement functions of TDMOS 106 associated with arranging for user selection of one or more computer-usable descriptors 110. Aspects of descriptor identification engine 212 are responsible for presenting a user interface to a user; and for receiving and evaluating user-input information for various purposes, such as to identify, use, or update established collections of computer-usable descriptors 110 (or portions thereof) that are accessible via networks 115 at predetermined processing locations. In one implementation, description identification engine 212 implements one or more features of a wide-area or local-area network service. In another implementation, description identification engine 212 implements one or more features of a client-based application.

Semantic association engine 214 is configured to implement functions of TDMOS 106 that relate to associating user selected computer-usable descriptors 110 with digital media objects 103 originating from personal digital media sources 104, independent of whether a digital media object is registered with a particular personal digital media content sharing service. Aspects of semantic association engine 214 are responsible for tagging digital media objects 103 with selected computer-usable descriptors 103, which may include creating or storing data structures for representing associations between digital media objects 103 and computer-usable descriptors 110; and for using computer-usable descriptors 110 to search for digital media objects 103 via networks 115. In one possible implementation, semantic association engine 212 implements one or more features of a wide-area or local-area network service. In another implementation, semantic association engine 212 implements one or more features of a client-based application.

Figure 3:
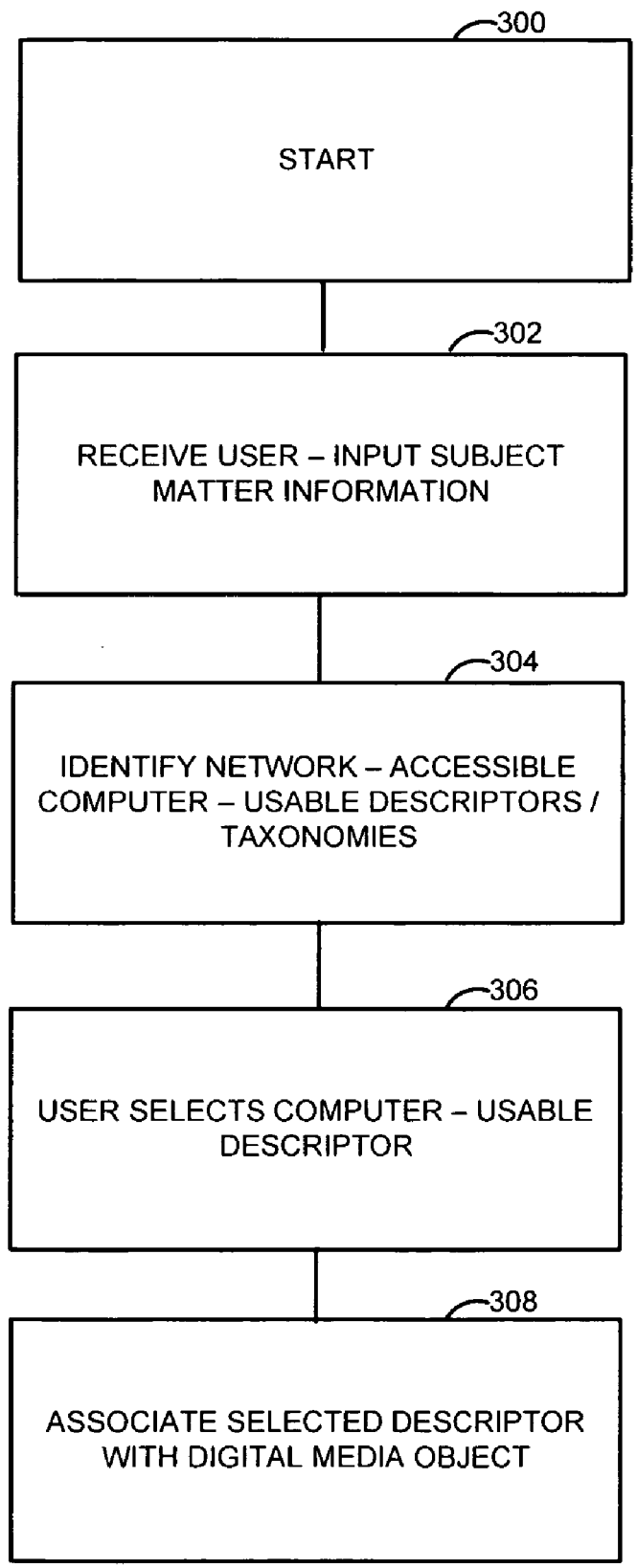
FIG. 3 is a flowchart illustrating certain aspects of a method performed by aspects of the system shown in FIG. 2.

With continuing reference to FIGS. 1 and 2, FIG. 3 is a flowchart illustrating certain aspects of a method for organizing digital media objects, such as digital media objects 103. The method(s) illustrated in FIG. 3 may be implemented using computer-executable instructions executed by one or more general, multi-purpose, or single-purpose processors (exemplary computer-executable instructions 406 and processor 402 are discussed further below, in connection with FIG. 4). Unless specifically stated, the methods described herein are not constrained to a particular order or sequence. In addition, some of the described method or elements thereof can occur or be performed concurrently. It will be understood that all of the steps shown need not occur in performance of the functions described herein.

The flowchart of FIG. 2 describes both network-side and/or client-side activities that would occur when a person 102, referred to as George, desires to (1) organize digital media objects 103 based on the subject matter of personal digital media content 105 within the digital media objects, or (2) search for digital media objects having related personal digital media content 105 that were uploaded to network(s) 115 by other people. For exemplary purposes, it is assumed that George is using his personal computer, which has Internet access, to organize photos of dogs that George took with his digital camera.

The method begins at block 300, and continues at block 302, where user-input information that corresponds to the subject matter of personal digital media content 105 is received. Examples of user-input information include binary values, numeric values, string values, and predetermined sets of values. Using George as an example, George may or may not initially be familiar with established computer-usable descriptors 110 that have real-world meanings corresponding to the subject matter of his own photos or of the photos he is searching for. If George is not initially familiar with established computer-usable descriptors or collections thereof, George may attempt to locate one or more data structures that store some relevant computer-usable descriptors at processing locations accessible via network 115, by providing user-input information via a user interface that corresponds to information within a particular digital photo from George's camera. For example, George may indicate that a particular digital photo is of a large dog. On the other hand, if George is already familiar with some established computer-usable descriptors or collections thereof, George may provide user-input information via a user interface that corresponds to a known computer-usable descriptor or data structure that is accessible via network 115.

Next, at block 304, network-accessible computer-usable descriptors, or collections thereof referred to as taxonomies, are identified. In general, such identification involves evaluating a relationship between the user-input information and one or more real-world meanings stored in conjunction with one or more computer-usable descriptors or taxonomies. Relevant computer-usable descriptors, taxonomies, or processing locations thereof may be presented via a user interface.

If George is not already familiar with some established computer-usable descriptors or taxonomies, it is possible that the subject matter of the photos George is organizing or searching for may not correspond to an agreed-upon, network-accessible computer-usable descriptor or taxonomy. In that case, George may use a user interface to create and publish a new computer-usable descriptor or taxonomy at a network processing location.

In the case where one or more established computer-usable descriptors or taxonomies are accessible via network(s) 115, a user interface may allow George to retrieve and connect to processing locations at which such established computer-usable descriptors or taxonomies are published. For example, an established tree data structure that includes large breeds of dogs may be identified. It may be desirable for a network-based or a client-based application to allow users to link between computer-usable descriptors or taxonomies at different processing locations.

Generally, new and established computer-usable descriptors or taxonomies are made available via network(s) 115 in a manner that allows for the collaborative updating of the computer-usable descriptors or taxonomies. In one optional scenario, collections of computer-usable descriptors are updatable by users in a Wiki-like manner—that is, users may add, remove, or otherwise edit computer-usable descriptors in a particular taxonomy. The taxonomy is generally overseen or moderated by an individual or entity, which can accept or reject any additions, deletions, or edits to the taxonomy. The moderator of the taxonomy may choose to automatically accept or reject updates to the taxonomy based on stored preferences. Alternatively, updates to the taxonomy may be evaluated on a case-by-case basis. It may be desirable to save one or more iterations of the taxonomy, in case the moderator wishes to return to a previous iteration.

At block 306, one or more computer-usable descriptors 110 having real-world meanings are selected. In one scenario, George may copy a selected computer-usable descriptor for one-time use. In another scenario, George may subscribe to updates of the selected computer-usable descriptor or taxonomy. To accomplish a subscription to updates, a service to handle such subscriptions may be provided (for example, a web service), to which a client-side application may read and/or write. The client-side application may be configured to be an RSS-aware system, so that RSS feeds would be available whenever network access is available. Alternatively, the client-side application may support asynchronous messaging paradigms such as "pub/sub."

The computer-usable descriptors 110 selected at block 306 are associated with a particular digital media object 103, at block 308. The association(s) then serve as a semantic medium for the exchange of information about the personal digital media content of the digital media object, independent of whether the digital media object is registered with a personal digital media content sharing service.

In the case where George is organizing his own dog photos, a particular dog photo may be tagged with the selected computer-usable descriptor. Alternatively, it may be desirable to allow users to link between computer-usable descriptors and digital media objects. In one exemplary implementation, the association between computer-usable descriptors and digital media objects may be accomplished using a data structure having at least two portions—a first portion having information identifying the computer-usable descriptor and the second portion having information identifying the digital media object.

In the case where George is searching for digital media objects uploaded to network(s) 115 by other people, the computer-usable descriptors selected by George may be used to search for digital media objects, using searching tools and techniques adapted for use with the type of data structures used to store the computer-usable descriptors.

In this manner, it is possible to leverage the consistent associations between computer-usable descriptors and digital media objects. People around the world collaborating to create taxonomies of computer-usable descriptors having agreed-upon real-world meanings, and using the descriptors to tag digital media objects, enables the efficient, computerized discovery of relevant personal digital media content within digital media objects originating from a wide variety of personal digital media sources, even when the digital media objects themselves are not registered with a common online digital media sharing service.

With continued reference to FIGS. 1-4, FIG. 5 is a block diagram of an exemplary configuration of an operating environment 400 (such as a client-side device or client-based application or a network server or service) in which all or part of TDMOS 106, and/or the method(s) shown and discussed in connection with FIG. 3 may be implemented or used. Operating environment 400 is generally indicative of a wide variety of general-purpose or special-purpose computing environments, and is not intended to suggest any limitation as to the scope of use or functionality of the system(s) and methods described herein. For example, operating environment 400 may be a type of portable or non-portable device such as a personal media rendering device, a personal computer, a phone, a digital camera, a server, a digital video recorder, or a personal digital assistant.

As shown, operating environment includes processor 402, computer-readable media 404, and computer-executable instructions 406. One or more internal buses 421, which are widely available elements, may be used to carry data, addresses, control signals and other information within, to, or from operating environment 400 or elements thereof.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording, storing, or transmitting computer-readable data, such as computer-executable instructions 406, digital media objects 103, or computer-usable descriptors 110. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 404 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement user interface functions 403, which implement aspects of user interface 202 (shown in FIG. 2); certain computer-executable instructions 406 implement network interface functions 410, which implement aspects of network interface(s) 210; certain computer-executable instructions 406 implement descriptor identification functions 412, which implement aspects of descriptor identification engine 212; and certain computer-executable instructions 406 implement semantic association functions 414, which implement aspects of semantic association engine 214.

Input interface(s) 416 are physical or logical elements that facilitate receipt of input to operating environment 400. Input may be received using any type of now known or later-developed physical or logical elements, such as user interfaces, remote controls, displays, mice, pens, styluses, trackballs, keyboards, microphones, scanning devices, and all types of devices that are used input data.

Output interface(s) 418 are physical or logical elements that facilitate provisioning of output from operating environment 400. Output may be provided using any type of now known or later-developed physical or logical elements, such as user interfaces, displays, printers, speakers, disk drives, and the like.

Network interface(s) 210 (discussed in more detail above, in connection with FIG. 2) are one or more physical or logical elements that enable communication by operating environment 400 via one or more protocols or techniques.

Specialized hardware 442 represents any hardware or firmware that implements functions of operating environment 400. Examples of specialized communication hardware include encoder/decoders ("CODECs"), decrypters, application-specific integrated circuits, secure clocks, and the like.

It will be appreciated that particular configurations of operating environment 400 or TDMOS 106 may include fewer, more, or different components or functions than those described. In addition, functional components of operating environment 400 or TDMOS 106 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A computer-readable storage medium encoded with computer-executable instructions which, when executed by a processor, perform a method for semantically conveying information about personal digital media content, comprising:

identifying a plurality of predefined computer-usable descriptors published at a network-side processing location, the plurality of predefined computer-usable descriptors comprising a taxonomy relating to a body of knowledge, the plurality of computer-usable descriptors collaboratively edited by multiple end-users of personal digital media content, at least some of the end-users accessing the plurality of computer-usable descriptors via electronic devices operating within different networks, each computer-usable descriptor having an agreed-upon real-world meaning, the taxonomy moderated by an entity that accepts or rejects edits to the plurality of computer-readable descriptors;

presenting a user interface to an end-user of personal digital media content;

identifying a digital media object comprising personal digital media content originating from a personal digital media source, the digital media object not available for distribution via any commercial media content source;

via the user interface, receiving from the end-user edits of one or more of the plurality of computer-usable descriptors comprising the taxonomy;

receiving from the end-user a selection of a computer-usable descriptor having an agreed-upon real-world meaning related to the digital media object, the selected computer-usable descriptor being one of the one or more edited computer-usable descriptors; and tagging the digital media object with the selected computer-usable descriptor, the tagging serving as a semantic medium for exchange of information about the digital media object via a network in such a manner that the tagged digital media object is able to be located by searching the network for the selected computer-usable descriptor, independent of whether the digital media object is registered with a personal digital media content sharing service.

2. The computer-readable storage medium according to claim 1, wherein the digital media object is accessible via a personal digital media source selected from the group consisting of a computer, a digital media player, a personal digital assistant, and a mobile phone.

3. The computer-readable storage medium according to claim 1, wherein the computer-usable descriptor corresponds to a data element of a data structure having a plurality of data elements, each data element corresponding to a particular real-world meaning, the data structure accessible at a first processing location via a wide-area network.

4. The computer-readable storage medium according to claim 1, wherein the first data structure comprises a hierarchically organized data structure.

5. The computer-readable storage medium according to claim 3, wherein the digital media object is accessible at a second processing location via the wide-area network, and wherein the step of tagging the digital media object with the selected computer usable descriptor comprises arranging for establishment of a hyperlink between the first processing location and the second processing location.

6. The computer-readable storage medium according to claim 3, wherein the step of tagging the digital media object with the selected computer usable descriptor comprises identifying a digital media object having a second computer-usable descriptor associated therewith, the second computer-usable descriptor semantically related to the selected computer-usable descriptor.

7. The computer-readable storage medium according to claim 6, wherein the second computer-usable descriptor corresponds to a data element within the same data structure as the selected computer-usable descriptor.

8. The computer-readable storage medium according to claim 6, wherein the second computer-usable descriptor corresponds to a data element within a different data structure than the selected computer-usable descriptor.

9. The computer-readable storage medium according to claim 1, wherein the computer-executable instructions are executable by a client-side processor.

10. The computer-readable storage medium according to claim 1, wherein the computer-executable instructions are executable by a network-side processor.

* * * * *